Patented May 22, 1923.

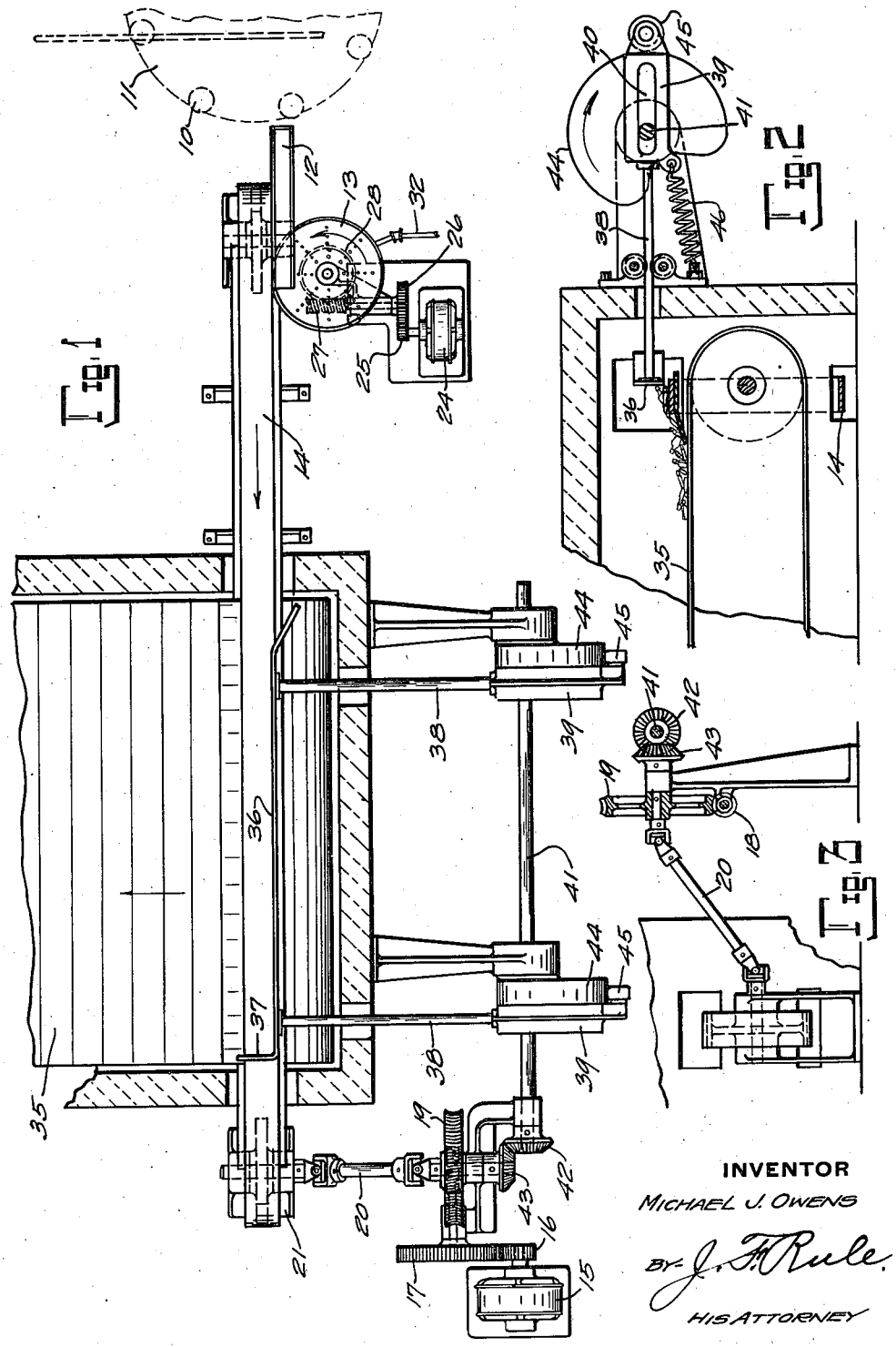

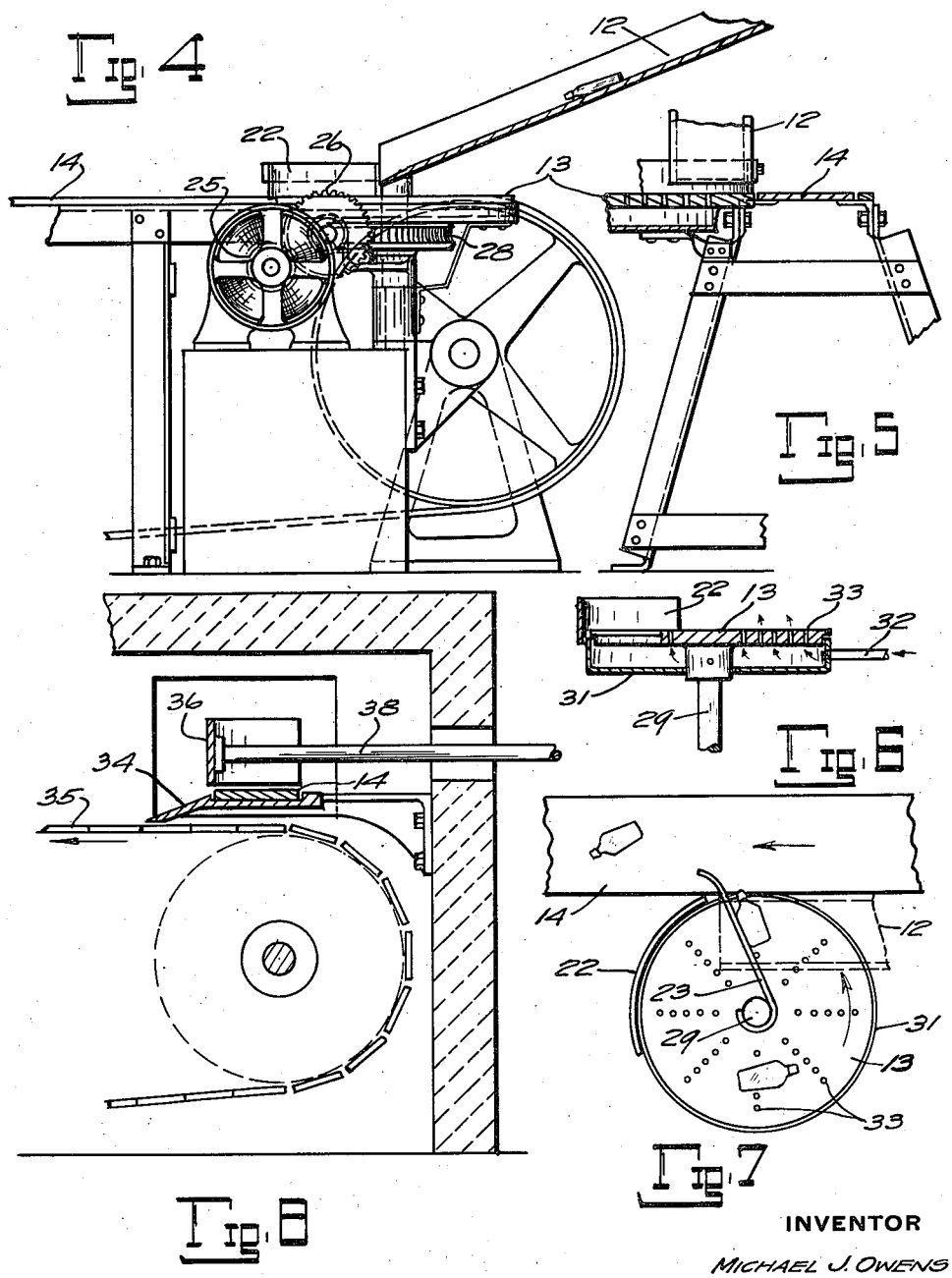

1,455,966

UNITED STATES PATENT OFFICE.

MICHAEL J. OWENS, OF TOLEDO, OHIO, ASSIGNOR TO THE OWENS BOTTLE COMPANY, OF TOLEDO, OHIO, A CORPORATION OF OHIO.

MECHANISM FOR CONVEYING HOT GLASSWARE.

Application filed October 6, 1921. Serial No. 505,748.

*To all whom it may concern:*

Be it known that I, MICHAEL J. OWENS, a citizen of the United States, residing at Toledo, in the county of Lucas and State of Ohio, have invented new and useful Improvements in Mechanism for Conveying Hot Glassware, of which the following is a specification.

My invention relates to apparatus particularly adapted for receiving bottles or other glassware from a forming machine and transferring them to an annealing oven or leer. The articles as they are discharged from the forming molds are hot and somewhat plastic and easily marred, so that if permitted to knock against each other or come in contact before they have cooled to a certain extent, there is liability of them sticking together or being broken, scratched or otherwise disfigured.

An object of my invention is to provide suitable means for preventing the articles from coming in contact with each other during their passage from the machine to the leer, before they have cooled sufficiently to prevent injury by such contact.

In carrying out my invention in its preferred form, the bottles or other articles as they are discharged from the molds, slide down an inclined chute onto a rotating transfer disk which delivers them to a horizontally moving conveyor extending into the leer. This disk serves to prevent the bottles from coming in contact before they have reached the leer and also permits the articles to be cooled. Means may be provided for supplying cooling air to the articles while on said disk.

Other features of the invention will appear hereinafter.

In the accompanying drawings:

Figure 1 is a part sectional plan view of an apparatus constructed in accordance with my invention.

Figure 2 is a sectional side elevation of the end of the leer and the carrying-in mechanism.

Figure 3 is a detail view in sectional elevation of gearing through which the carrying-in conveyor is driven.

Figure 4 is an elevation showing particularly the mechanism by which the articles are transferred from the inclined chute to the carrying-in belt.

Figure 5 is a fragmentary sectional view looking in a direction at right angles to that of Figure 4, showing a portion of the rotating transfer table or disk.

Figure 6 is a part sectional elevation of said disk.

Figure 7 is a plan view of the same.

Figure 8 is a sectional elevation showing particularly the pusher-bar by which the bottles are pushed from the carrying-in belt to the leer conveyor.

The apparatus herein shown is of the same general character as that disclosed in the patent to Lents, No. 1,289,208, December 31, 1918, but involves certain improvements thereover.

Bottles or other articles are delivered from the molds 10 of a glass forming machine 11 to an inclined chute 12 down which they slide one by one onto a continuously rotating transfer disk or table 13 by which they are transferred to a continuously running belt conveyor 14 which extends from said table to and through the leer. The carrying-in conveyor 14 is driven by a motor 15 through gears 16, 17, 18, 19, shaft 20 and pulley 21.

The transfer disk or table 13 is located directly beneath the lower end of the chute 12 and is rotated continuously about a vertical axis in the direction indicated by the arrows (Figs. 1 and 7). The bottles or other articles drop from the chute onto this disk and are prevented from being thrown off the disk by a stationary guard 22. The bottles travel with the disk until arrested by a stationary deflector or guard 23 so arranged that it deflects or cams the bottles onto the conveyor 14 which is preferably in substantially the same horizontal plane as the disk. A motor 24 is connected through gears 25, 26, 27 and 28 to rotate the disk continuously, the gear 28 being fixed to a vertical shaft 29 which carries the disk 13.

Each bottle or other article as it slides from the chute onto the disk is carried by the latter out of the way of the next succeeding bottle and thus prevented from contacting therewith. They are also by the disk properly spaced on the carrying-in belt so that contact of one bottle with another is prevented until they have entered the leer or have cooled sufficiently to prevent injury due to such contact. If desired, cooling means may be provided in connection with the turn table. For this purpose, a stationary casing 31 is arranged beneath the table and provides an air chamber to which air under pressure may be supplied through a pipe 32. This air is transmitted through a multiplicity of perforations 33 in the table and impinges against the bottles thereon.

The ware which is carried into the leer is periodically pushed from the carrying-in belt 14 onto an incline 34 and from thence onto the leer conveyor 35 by means of a pusher-bar 36. The latter has an extension 37 at one end thereof which prevents the articles from being carried beyond the leer by the conveyor 14. Rods 38 attached to the bar 36 and extending rearwardly therefrom are provided at their rear ends with heads 39 having slots 40 through which extends a continuously rotating horizontal shaft 41. The latter is driven through gears 42 and 43, the gear 43 being fixed to the shaft of the worm gear 19. Cams 44 fixed to the shaft 41 are engaged by cam rolls 45 on the heads 39. Springs 46 hold said rolls in contact with the cams. The cams operate to periodically reciprocate the pusher-bar 36 so that the bottles which have accumulated thereon are pushed onto the incline 34 and from thence onto the leer conveyor. It will be noted that the cams 44 are so shaped that a quick forward movement of the pusher-bar is permitted under the influence of the springs 46, and that it is also quickly returned so as not to materially interfere with the movement of the articles into the leer. The leer conveyor 35 may be driven either intermittently or continuously by any suitable mechanism.

Modifications may be resorted to within the spirit and scope of my invention.

What I claim is:

1. In apparatus for transferring hot glassware, the combination of an inclined chute down which articles are carried by gravity, a horizontally traveling conveyor, a table beneath the chute onto which the articles are discharged from the chute, said table being rotatable about a vertical axis and in substantially the same horizontal plane as said conveyor, and means to guide articles from the table onto the conveyor, the point at which the articles are discharged onto the table being so arranged that the articles are carried on the table through the greater portion of a complete rotation and pass beneath the chute to the conveyor.

2. In apparatus for transferring hot glassware, the combination of an inclined chute, a horizontally traveling conveyor, a table beneath the chute onto which the articles are discharged from the chute, said table being rotatable about a vertical axis and in substantially the same horizontal plane as said conveyor, means to guide articles from the table onto the conveyor, the point at which the articles are discharged onto the table being so arranged that the articles are carried on the table through the greater portion of a complete rotation and pass beneath the chute to the conveyor, and a guard arranged to prevent articles from being thrown off the table as they are delivered thereto from the chute.

3. In apparatus for transferring hot glassware, the combination of an inclined chute, a horizontally traveling conveyor, a transfer table arranged to carry ware from the chute to the conveyor, said table being provided with a multiplicity of perforations, and means for supplying air through said perforations for cooling the ware.

4. The combination of a continuously traveling horizontal conveyor belt, a table at one side of and in the plane of the belt, a longitudinal edge of the belt being substantially tangent to the periphery of the table, means to rotate the table continuously about a vertical axis, an inclined chute having its discharge end over the table, a guard at the periphery of the table in position to arrest articles delivered from said chute, and a radially disposed deflector by which articles are guided from the table onto the conveyor after passing beneath the chute.

5. The combination of a horizontally traveling conveyor, an inclined chute arranged with its vertical plane parallel with the direction of movement of the conveyor, and a transfer table rotatable about a vertical axis, said table being positioned laterally of the conveyor with its periphery substantially tangent to a longitudinal edge of the conveyor, said plane being between said axis and the conveyor.

6. The combination of a leer conveyor, a carrying-in conveyor arranged over the leer conveyor and extending transversely thereof, a pusher-bar extending lengthwise of the carrying-in conveyor, and means to periodically move said bar forward across the carrying-in conveyor and withdraw it by a rapid movement, said movements of the pusher-bar being effected in a small fraction of the time the bar remains in retracted position between successive operations, whereby interference between said bar and articles being carried into the leer is prevented.

7. The combination of a leer conveyor, a carrying-in conveyor arranged over the leer conveyor and extending transversely thereof, a pusher-bar extending lengthwise of the carrying-in conveyor, and means to periodically move said bar forward across the carrying-in conveyor and withdraw it, said bar having an extension at one end thereof in position to prevent articles from being carried beyond the leer by said carrying-in conveyor.

8. The combination of a leer conveyor, a carrying-in conveyor arranged over the leer conveyor and extending transversely thereof, a pusher-bar extending lengthwise of the carrying-in conveyor, and means to periodically move said bar forward across the carrying-in conveyor and withdraw it by a rapid movement, said movements of the pusher-bar being effected in a small fraction of the time the bar remains in retracted position between successive operations, whereby interference between said bar and articles being carried into the leer is prevented, said bar having an extension at one end thereof in position to prevent articles from being carried beyond the leer by said carrying-in conveyor.

9. In apparatus for transferring hot glassware, the combination of an inclined chute, a horizontally traveling conveyor, a transfer device arranged to receive articles directly from the chute, hold them in spaced relation and transfer them to the conveyor, and means for cooling the articles while on the transfer device.

Signed at Toledo, in the county of Lucas and State of Ohio, this 1st day of October, 1921.

MICHAEL J. OWENS.